(12) United States Patent  
Ishii et al.

(10) Patent No.: US 8,971,230 B2
(45) Date of Patent: Mar. 3, 2015

(54) MOBILE COMMUNICATION METHOD, RADIO BASE STATION APPARATUS AND MOBILE STATION

(75) Inventors: Minami Ishii, Yokohama (JP); Sadayuki Abeta, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 97 days.

(21) Appl. No.: 12/673,809

(22) PCT Filed: Aug. 14, 2008

(86) PCT No.: PCT/JP2008/064599
§ 371 (c)(1),
(2), (4) Date: Apr. 9, 2010

(87) PCT Pub. No.: WO2009/025236
PCT Pub. Date: Feb. 26, 2009

(65) Prior Publication Data
US 2010/0246510 A1    Sep. 30, 2010

(30) Foreign Application Priority Data
Aug. 17, 2007  (JP) ................ P2007-213182

(51) Int. Cl.
*H04H 20/71* (2008.01)
*H04B 7/14* (2006.01)
*H04J 1/10* (2006.01)
*H04J 3/08* (2006.01)
*H04W 74/00* (2009.01)
*H04W 74/08* (2009.01)

(52) U.S. Cl.
CPC ........ *H04W 74/008* (2013.01); *H04W 74/0833* (2013.01)
USPC ............................ 370/312; 370/315; 370/329

(58) Field of Classification Search
USPC ......................................................... 370/312
See application file for complete search history.

(56) References Cited

U.S. PATENT DOCUMENTS

2001/0008001 A1* 7/2001 Suemura ........................ 710/129
2001/0024956 A1* 9/2001 You et al. ....................... 455/455
2001/0053140 A1* 12/2001 Choi et al. ..................... 370/335

(Continued)

FOREIGN PATENT DOCUMENTS

JP      2001-352273 A    12/2001

OTHER PUBLICATIONS

Extended Search Report for European Application No. 08792480.9 dated Jul. 1, 2011 (5 pages).
Ericsson, TSG-RAN WG1 LTE AdHoc, R1-060109, "Uplink Scrambling for E-UTRA", XP50417487, Helsinki, Finland, Jan. 23-25, 2006 (2 pages).
International Search Report w/translation from PCT/JP2008/064599 dated Nov. 18, 2008 (3 pages).

(Continued)

*Primary Examiner* — Ian N Moore
*Assistant Examiner* — Jenee Williams
(74) *Attorney, Agent, or Firm* — Osha Liang LLP (57) ABSTRACT

A radio base station apparatus (10) according to the present invention includes: an uplink resource assignor unit (13) configured to assign an uplink resource to a mobile station (01) in response to a random access signal which the mobile station (01) transmits by use of a random access preamble; a random access response signal transmitter unit (14) configured to notify the mobile station (01) of the uplink resource by using a random access response signal; and an uplink scramble decoder unit (16) configured to perform descrambling processing on an uplink signal transmitted from the mobile station (01) by use of the uplink resource, by using an uplink scrambling sequence corresponding to the uplink resource.

1 Claim, 6 Drawing Sheets

(56) References Cited

U.S. PATENT DOCUMENTS

| | | | |
|---|---|---|---|
| 2002/0041578 A1* | 4/2002 | Kim et al. | 370/335 |
| 2002/0075839 A1* | 6/2002 | Dick et al. | 370/342 |
| 2004/0146019 A1* | 7/2004 | Kim et al. | 370/329 |
| 2004/0223472 A1* | 11/2004 | Sankaran et al. | 370/335 |
| 2004/0228305 A1* | 11/2004 | Grieco | 370/335 |
| 2005/0047530 A1* | 3/2005 | Lee et al. | 375/343 |
| 2005/0053041 A1* | 3/2005 | Cheong | 370/335 |
| 2005/0201315 A1* | 9/2005 | Lakkis | 370/315 |
| 2005/0259621 A1* | 11/2005 | Lee | 370/335 |
| 2006/0007896 A1* | 1/2006 | Grieco | 370/335 |
| 2006/0098599 A1* | 5/2006 | Choi et al. | 370/331 |
| 2006/0252377 A1* | 11/2006 | Jeong et al. | 455/67.13 |
| 2006/0280142 A1* | 12/2006 | Damnjanovic et al. | 370/329 |
| 2007/0111751 A1* | 5/2007 | Iimori | 455/550.1 |
| 2007/0206531 A1* | 9/2007 | Pajukoski et al. | 370/329 |
| 2008/0101313 A1* | 5/2008 | Choi et al. | 370/342 |
| 2008/0182594 A1* | 7/2008 | Flore et al. | 455/458 |
| 2008/0207196 A1* | 8/2008 | Pettersson | 455/424 |
| 2009/0041240 A1* | 2/2009 | Parkvall et al. | 380/247 |
| 2009/0122839 A1* | 5/2009 | Luo et al. | 375/145 |

OTHER PUBLICATIONS

Written Opinion from PCT/JP2008/064599 dated Nov. 18, 2008 (3 pages).

3GPP TS 25.213 V5.5.0; "Spreading and modulation (FDD)"; Dec. 2003 (28 pages).

3GPP TS 36.211 V1.0.3; "Physical Channels and Modulation"; May 2007 (34 pages).

3GPP TS 36.300 V8.1.0; "Evolved Universal Terrestrial Radio Access (E-UTRA) and Evolved Universal Terrestrial Radio Access Network (E-UTRAN); Overall description; Stage 2"; Jun. 2007 (106 pages).

Office Action for Russian Application No. 2010-108351 dated Jan. 15, 2012, with English translation thereof (12 pages).

Office Action for Canadian Application No. 2,696,702 dated Apr. 15, 2013 (6 pages).

Office Action in counterpart Canadian Patent Application No. 2,696,702, mailed Jun. 4, 2014 (5 pages).

* cited by examiner

| UPLINK RESOURCE | UPLINK SCRAMBLING SEQUENCE |
|---|---|
| UPLINK RESOURCE NUMBER 1 | UPLINK SCRAMBLING SEQUENCE NUMBER 1 |
| UPLINK RESOURCE NUMBER 2 | UPLINK SCRAMBLING SEQUENCE NUMBER 2 |
| UPLINK RESOURCE NUMBER 3 | UPLINK SCRAMBLING SEQUENCE NUMBER 3 |
| ... | ... |

FIG. 5

| RANDOM ACCESS PREAMBLE | UPLINK SCRAMBLING SEQUENCE |
|---|---|
| RANDOM ACCESS PREAMBLE IDENTIFIER 1 | UPLINK SCRAMBLING SEQUENCE NUMBER 1 |
| RANDOM ACCESS PREAMBLE IDENTIFIER 2 | UPLINK SCRAMBLING SEQUENCE NUMBER 2 |
| RANDOM ACCESS PREAMBLE IDENTIFIER 3 | UPLINK SCRAMBLING SEQUENCE NUMBER 3 |
| ... | ... |

FIG. 7

| RANDOM ACCESS RESPONSE SIGNAL | UPLINK SCRAMBLING SEQUENCE |
|---|---|
| RANDOM ACCESS RESPONSE SIGNAL IDENTIFIER 1 | UPLINK SCRAMBLING SEQUENCE NUMBER 1 |
| RANDOM ACCESS RESPONSE SIGNAL IDENTIFIER 2 | UPLINK SCRAMBLING SEQUENCE NUMBER 2 |
| RANDOM ACCESS RESPONSE SIGNAL IDENTIFIER 3 | UPLINK SCRAMBLING SEQUENCE NUMBER 3 |
| ... | ... |

US 8,971,230 B2

MOBILE COMMUNICATION METHOD, RADIO BASE STATION APPARATUS AND MOBILE STATION

TECHNICAL FIELD

The present invention relates to a mobile communication method, a radio base station apparatus and a mobile station.

BACKGROUND ART

Figure 2:
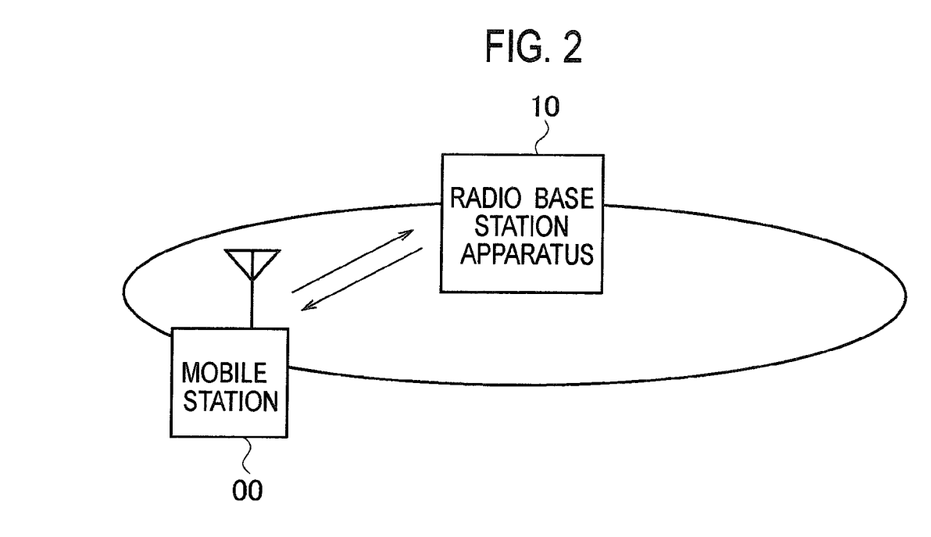
FIG. 2 is an entire configuration diagram of the general mobile communication system and a mobile communication system according to a first embodiment of the present invention.

A mobile communication system that is studied as an evolved universal terrestrial radio access network (E-UTRAN) includes a mobile station 00 and a radio base station apparatus 10 as shown in FIG. 2.

Figure 1:
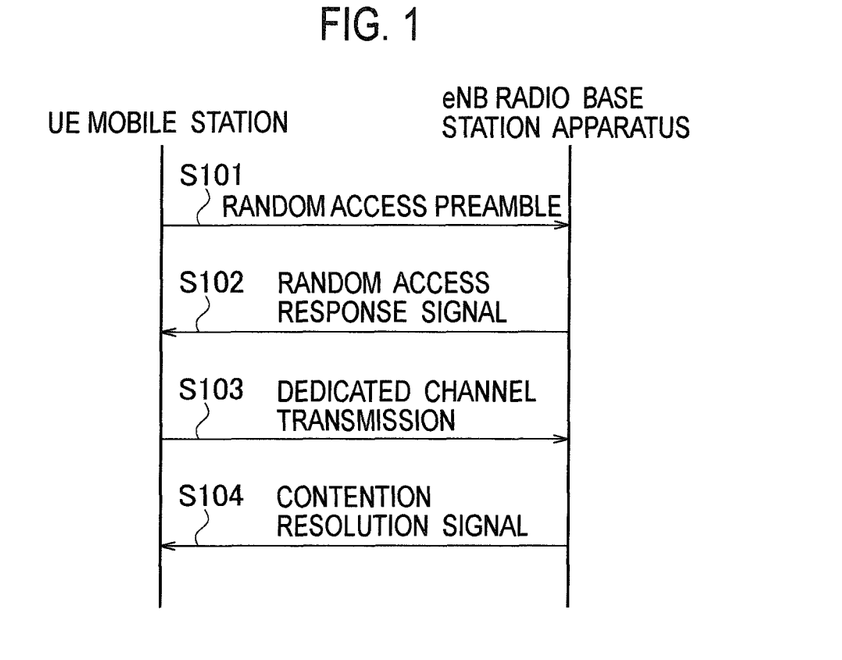
FIG. 1 is a sequence chart for explaining operations of a general mobile communication system.

Such a mobile communication system is configured to perform a contention-based random access procedure as shown in FIG. 1, by using a random access signal (contending-channel signal; Random access preamble) on the following occasions:

an occasion in which the mobile station 00 starts communications with the radio base station apparatus 10;

an occasion in which the mobile station 00 starts communications with a handover target cell; and an occasion in which the mobile station 00 resumes communications with a cell to which the mobile station 00 is currently connected.

Here, such a random access procedure will be described with reference to FIG. 1 (refer to Non-patent Document 1).

As shown in FIG. 1, in step S101, a mobile station UE selects one random access preamble identifier among from a plurality of random access preamble identifiers, and transmits a random access preamble (RA-preamble) identified with the selected random access preamble identifier to a radio base station apparatus eNB.

In step S102, upon detecting one or multiple random access preambles transmitted by one or multiple mobile stations UE, the radio base station apparatus eNB transmits a random access response signal identifier (RA-RNTI: Random access radio network temporal identifier), which is used for identifying a random access response signal (contending-channel response signal; Random Access Response), to each of the one or multiple mobile stations UE, together with a random access response signal including at least the following information elements.

an RA-preamble identifier;

timing alignment information;

an uplink assigned resource (Initial UL grant); and a temporary mobile station identifier (Temporary C-RNTI: cell specific radio network temporal identifier).

In step S103, upon receiving the random access response signal, the mobile station UE transmits an uplink signal by using the uplink resource assigned and indicated by the radio base station apparatus eNB.

In step 104, since there is a possibility that contention occurs between the multiple base stations UE when the random access signals (Random access preambles) are received, the radio base station apparatus eNB, which has received the uplink signals from the mobile stations UE, transmits a contention resolution signal (Contention resolution) to resolve the contention.

On the other hands, when transmitting the uplink signal, a mobile stations UE for which an uplink scrambling sequence is set transmits the uplink signal after performing scramble processing in which a scrambling sequence specific to the mobile station (UE specific scrambling sequence) is used (refer to Non-patent Document 2).

However, in a case where the mobile stations UE starts the random access procedure for any one of the following purposes, there is a problem that the mobile station UE cannot scramble an uplink signal in step 103, since the radio base station apparatus eNB would not be able to specify the mobile station transmitting the uplink signal in step 103 shown in FIG. 1:

the mobile station UE starts communications with the radio base station apparatus eNB;

the mobile station UE starts communications with a handover target cell; and the mobile station UE resumes communications with a cell to which the mobile station UE is currently connected.

Additionally, in a case where the mobile station UE transmits an uplink signal in step 103 without performing scramble processing, there is a problem that uplink interference to neighboring cells increases.

Non-patent Document 1: 3GPP TS 36.300 Evolved universal terrestrial Radio access (E-UTRA) and E-UTRAN Overall description; Stage 2 (Release 8) V8.1.0

Non-patent Document 2: 3GPP TS 36.211 Physical channels and modulation (Release 8) V1.0.3

DISCLOSURE OF THE INVENTION

Consequently, the present invention was made in view of the above described problems, and an object thereof is to provide a mobile communication method, a radio base station apparatus and a mobile station that reduce uplink interference to neighboring cells by enabling a mobile station to perform scramble processing on an uplink signal, and to transmit the uplink signal even before a radio base station apparatus specifies the mobile station.

A first aspect of the present invention is summarized as a mobile communication method in which a random access procedure is performed between a radio base station apparatus and a mobile station before communication is started or resumed therebetween, the method including the steps of: transmitting, from the mobile station to the radio base station apparatus, a random access preamble selected among from a plurality of random access preambles; assigning, at the radio base station apparatus, an uplink resource to the mobile station in response to the received random access preamble; notifying, from the radio base station apparatus to the mobile station, the assigned uplink resource by using a random access response signal; transmitting, at the mobile station, an uplink signal by using the uplink resource notified by use of the random access response signal, after performing scrambling processing by using an uplink scrambling sequence corresponding to the uplink resource; and performing, at the radio base station apparatus, descrambling processing on the uplink signal transmitted by use of the uplink resource, by using an uplink scrambling sequence corresponding to the uplink resource.

A second aspect of the present invention is summarized as a radio base station apparatus used in a mobile communication method in which a random access procedure is performed between the radio base station apparatus and a mobile station before communication is started or resumed therebetween, the radio base station apparatus including: an uplink resource assignor unit configured to assign an uplink resource to the mobile station in response to a random access preamble transmitted by the mobile station; a random access response signal transmitter unit configured to notify, to the mobile station, the uplink resource which is assigned by the uplink resource assignor unit, by using a random access response signal; and an uplink scramble decoder unit configured to perform descrambling processing on an uplink signal transmitted from the mobile station by use of the uplink resource, by using an uplink scrambling sequence corresponding to the uplink resource.

A third aspect of the present invention is summarized as a mobile station used in a mobile communication method in which a random access procedure is performed between a radio base station apparatus and the mobile station before communication is started or resumed therebetween, the mobile station including a random access preamble transmitter unit configured to transmit, to the radio base station apparatus, a random access preamble selected among from a plurality of random access preambles; a random access response signal receiver unit configured to receive, from the radio base station apparatus, a random access response signal which is used for notification of an uplink resource; and an uplink signal transmitter unit configured to perform scrambling processing that uses an uplink scrambling sequence corresponding to the uplink resource notified by use of the random access response signal, and to transmit an uplink signal by using the uplink resource.

A fourth aspect of the present invention is summarized as a mobile communication method in which a random access procedure is performed between a radio base station apparatus and a mobile station before communication is started or resumed therebetween, the method including the steps of: transmitting, from the mobile station to the radio base station apparatus, a random access preamble selected among from a plurality of random access preambles; assigning, at the radio base station apparatus, an uplink resource to the mobile station in response to the received random access preamble; notifying, from the radio base station apparatus to the mobile station, the assigned uplink resource by using a random access response signal; transmitting, at the mobile station, an uplink signal by using the uplink resource, after performing scrambling processing that uses an uplink scrambling sequence corresponding to the random access response signal used for the notification of the uplink resource; and performing, at the radio base station apparatus, descrambling processing on the uplink signal transmitted by use of the uplink resource, by using an uplink scrambling sequence corresponding to the random access response signal used for the notification of the uplink resource.

A fifth aspect of the present invention is summarized as a radio base station apparatus used in a mobile communication method in which a random access procedure is performed between the radio base station apparatus and a mobile station before communication is started or resumed therebetween, the radio base station apparatus including: an uplink resource assignor unit configured to assign an uplink resource to the mobile station in response to a random access preamble transmitted by the mobile station; an random access response signal transmitter unit configured to notify, to the mobile station, of the uplink resource which is assigned by the uplink resource assignor unit, by using a random access response signal; and an uplink scramble decoder unit configured to perform descrambling processing on an uplink signal transmitted from the mobile station by use of the uplink resource, by using an uplink scrambling sequence corresponding to the random access response signal used for the notification of the uplink resource.

A fifth aspect of the present invention is summarized as a mobile station used in a mobile communication method in which a random access procedure is performed between a radio base station apparatus and the mobile station before communication is started or resumed therebetween, the mobile station including: a random access preamble transmitter unit configured to transmit, to the radio base station apparatus, a random access preamble selected among from a plurality of random access preambles; a random access response signal receiver unit configured to receive a random access response signal which is used for notification of an uplink resource, from the radio base station apparatus; and an uplink signal transmitter unit configured to perform scrambling processing that uses an uplink scrambling sequence corresponding to the random access response signal used for the notification of the uplink resource, and, to transmit an uplink signal by using the uplink resource.

As has been described above, according to the present invention, a mobile communication method, a radio base station apparatus and a mobile station can be provided which reduce uplink interference to neighboring cells by enabling a mobile station to perform scramble processing on an uplink signal, and to transmit the uplink signal even before a radio base station apparatus specifies the mobile station.

BEST MODE FOR CARRYING OUT THE INVENTION

A mobile communication system according to a first embodiment of the present invention will be described with reference to FIGS. 2 to 8. Note that the same reference numerals are given to elements having the same functions in all of the drawings provided for explaining this embodiment, and repetitive descriptions will be omitted.

Although a mobile communication system using the LTE scheme will be described as an example for the mobile communication system in this embodiment, the present invention is applicable also to mobile communication systems other than the mobile communication system using the LTE scheme.

The mobile communication system according to this embodiment includes the mobile station 00 and the radio base station apparatus 10 as shown in FIG. 2.

The mobile communication system according to this embodiment is configured to perform a random access procedure, before the mobile station 00 and the radio base station apparatus 10 start or resume communications with each other.

Figure 3:
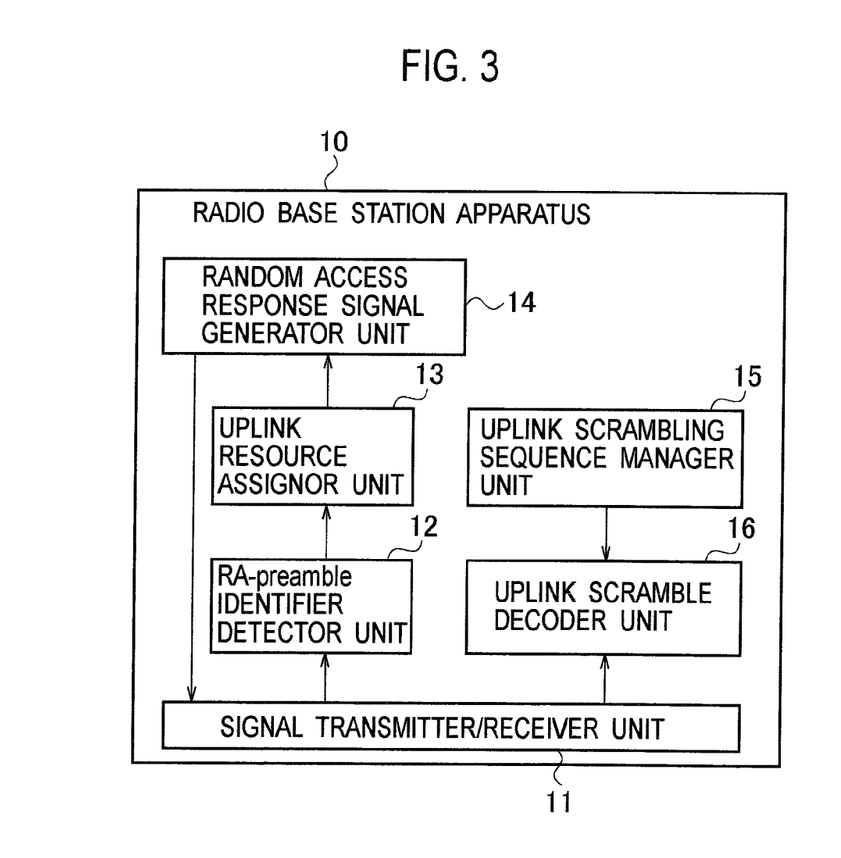
FIG. 3 is a functional block diagram of a radio base station apparatus according to the first embodiment of the present invention.

As shown in FIG. 3, the radio base station apparatus 10 according to this embodiment includes: a signal transmitter/receiver unit 11; a random access preamble identifier detector unit 12 connected to the signal transmitter/receiver unit 11; an uplink resource assignor unit 13 connected to the random access preamble identifier detector unit 12; a random access response signal generator unit 14 connected to the uplink resource assignor unit 13 and the signal transmitter/receiver unit 11; an uplink scramble decoder unit 16 connected to the signal transmitter/receiver unit 11; and an uplink scrambling sequence manager unit 15 connected to the uplink scramble decoder unit 16.

The signal transmitter/receiver unit 11 is configured to receive a signal transmitted by the mobile station 00, and to transmit a signal to the mobile station 00.

The random access preamble identifier detector unit 12 is configured to judge whether or not there is reception of a random access preamble from the mobile station 00. If judging that there is a reception, the random access preamble identifier detector unit 12 is configured to specify a random access preamble identifier through which such a random access preamble is identified.

The uplink resource assignor unit 13 is configured to assign an uplink resource to the mobile station 00, in response to a random access preamble transmitted by the mobile station 00.

Specifically, the uplink resource assignor unit 13 is configured to assign an uplink resource (uplink radio resource) to one or multiple random access preamble identifiers detected by the random access preamble identifier detector unit 12.

The random access response signal generator unit 14 is configured to notify, to the mobile station 00, an uplink resource assigned by the uplink resource assignor unit 13, by using a random access response signal.

Specifically, the random access response signal generator unit 14 is configured to generate a random access response signal including an uplink resource assigned by the uplink resource assignor unit 13 to each of random access preamble identifiers.

The random access response signal generator unit 14 may be configured to notify, to the mobile station 00, an uplink scrambling sequence corresponding to this uplink resource, together with an uplink resource.

In such a case, the random access response signal generator unit 14 is connected to the uplink scrambling sequence manager unit 15.

The uplink scrambling sequence manager unit 15 is configured to manage an uplink scrambling sequence that should be used when the mobile station 00 transmits an uplink signal by using an uplink resource assigned by the radio base station apparatus 10.

Figure 4:
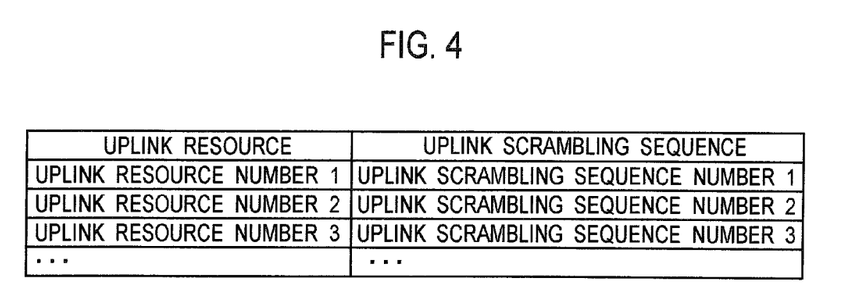
FIG. 4 is a diagram showing one example of a correspondence table of uplink resources and uplink scrambling sequences, which are managed by the radio base station apparatus according to the first embodiment of the present invention.

For example, the uplink scrambling sequence manager unit 15 may be connected to the uplink resource assignor unit 13, and be configured to manage an uplink scrambling sequence and an uplink resource assigned by an uplink resource assignor unit 13 in association with each other as shown in FIG. 4. Here, as information used for identifying an uplink resource, an uplink resource number may be used (refer to FIG. 4), or an uplink resource block number may be used.

Additionally, in a case where the uplink resource assignor unit 13 assigns a plurality of uplink resource blocks to the mobile station 00, the uplink scrambling sequence manager unit 15 may be configured to store a minimum value or a maximum value of uplink resource block numbers assigned to the mobile station 00 and an uplink scrambling sequence in association with each other.

Figure 5:
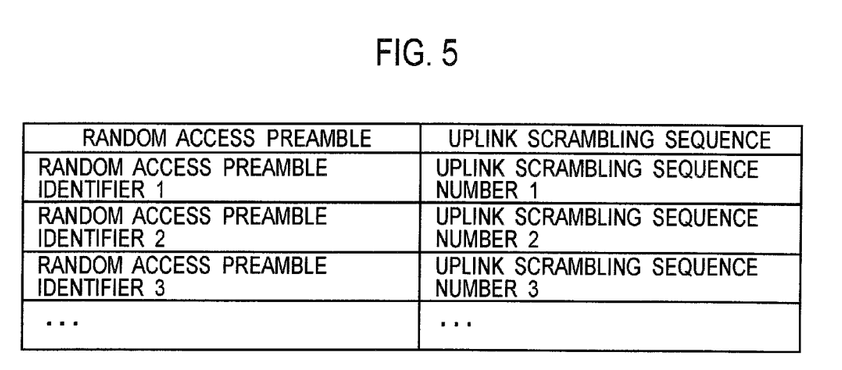
FIG. 5 is a diagram showing one example of a correspondence table of random access preamble identifiers and uplink scrambling sequences, which are managed by the radio base station apparatus according to the first embodiment of the present invention.

Furthermore, the uplink scrambling sequence manager unit 15 may be connected to the random access preamble identifier detector unit 12, and be configured to manage a random access preamble identifier detected by the random access preamble identifier detector unit 12 and an uplink scrambling sequence in association with each other as shown in FIG. 5.

Figure 6:
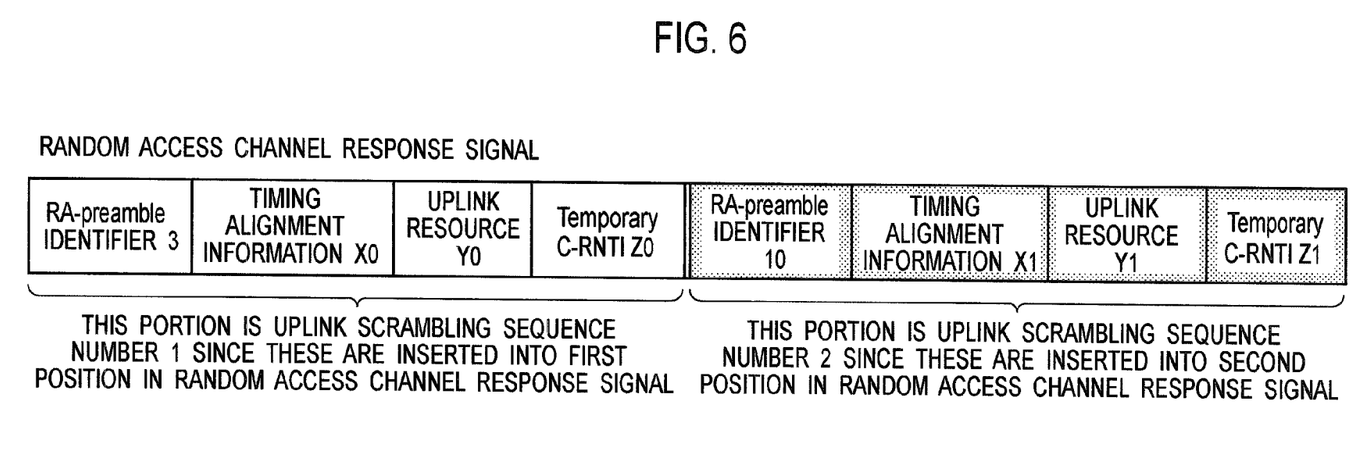
FIG. 6 is a diagram showing one example of a management method of uplink scrambling sequences, the management method performed by the radio base station apparatus according to the first embodiment of the present invention.

Moreover, the uplink scrambling sequence manager unit 15 may be connected to the random access response signal generator unit 14, and be configured to manage an insertion order of a random access preamble identifier in a random access response signal generated by the random access response signal generator unit 14, and an uplink scrambling sequence in association with each other, as shown in FIG. 6.

Figure 7:
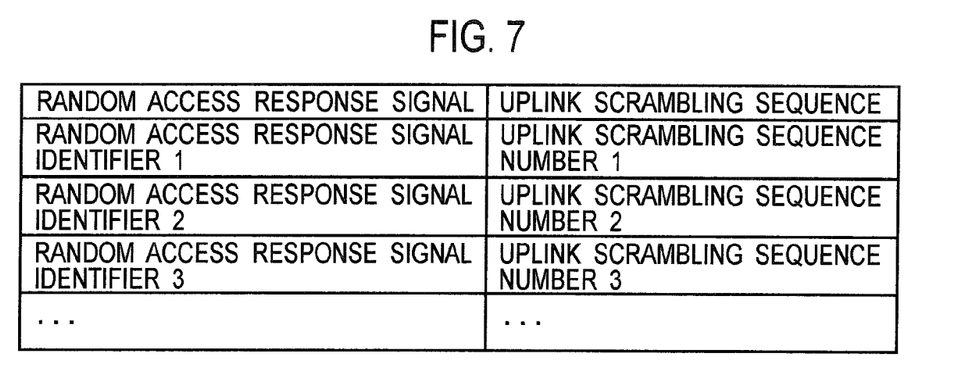
FIG. 7 is a diagram showing one example of a correspondence table of random access response signals and uplink scrambling sequences, which are managed by the radio base station apparatus according to the first embodiment of the present invention.

Additionally, the uplink scrambling sequence manager unit 15 may be connected to the random access response signal generator unit 14, and be configured to manage a random access response signal identifier indicating a random access response signal generated by the random access response signal generator unit 14, and an uplink scrambling sequence in association with each other, as shown in FIG. 7.

The uplink scramble decoder unit 16 is configured to perform descrambling processing on an uplink signal, which is transmitted from the mobile station 00 by use of an uplink resource, by using an uplink scrambling sequence corresponding to such an uplink resource.

For example, the uplink scramble decoder unit 16 may be configured to refer to the uplink scrambling sequence manager unit 15, and to perform the descrambling processing by using an uplink scrambling sequence corresponding to such an uplink resource.

Additionally, the uplink scramble decoder unit 16 may be configured to refer to the uplink scrambling sequence manager unit 15, and to perform the descrambling processing by using an uplink scrambling sequence corresponding to a random access preamble being a trigger for the assignment of such an uplink resource.

Furthermore, the uplink scramble decoder unit 16 may be configured to refer to the uplink scrambling sequence manager unit 15, and to perform the descrambling processing by using an uplink scrambling sequence corresponding to a random access response signal being used for the notification of such an uplink resource.

The uplink scramble decoder unit 16 may be configured to refer to the uplink scrambling sequence manager unit 15, and to perform the descrambling processing by using an uplink scrambling sequence corresponding to a position where a random access preamble identifier is inserted into the random access response signal used for the notification of the uplink resource.

Figure 8:
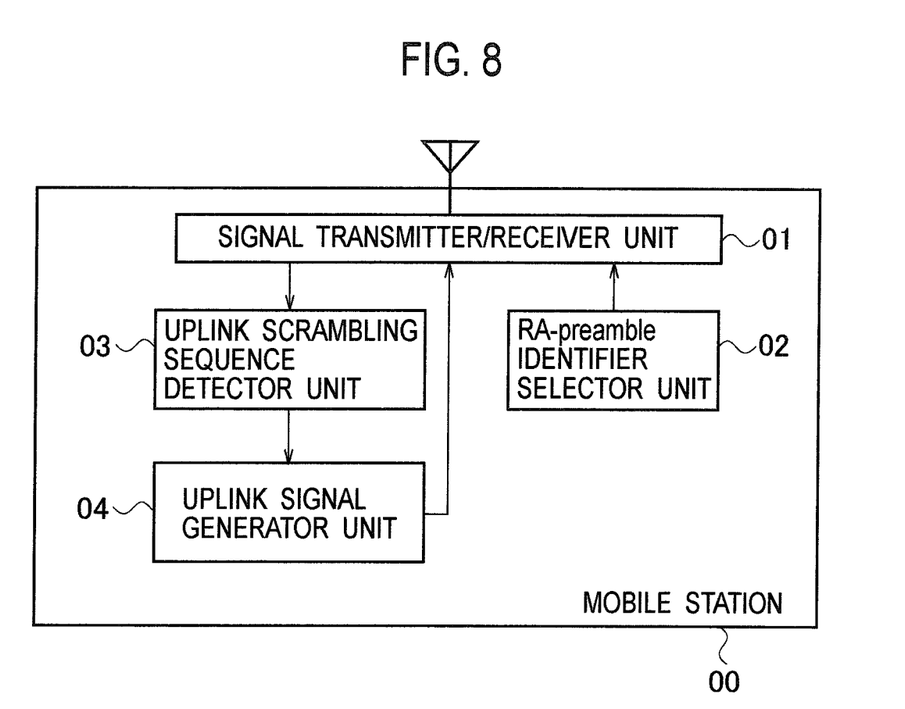
FIG. 8 is a functional block diagram of the radio base station apparatus according to the first embodiment of the present invention.

As shown in FIG. 8, the mobile station 00 according to this embodiment includes: a signal transmitter/receiver unit 01; a random access preamble identifier selector unit 02 connected to the signal transmitter/receiver unit 01; an uplink scrambling sequence detector unit 03 connected to the signal transmitter/receiver unit 01; and an uplink signal generator unit 04 connected to the uplink scrambling sequence detector unit 03 and the signal transmitter/receiver unit 01.

The signal transmitter/receiver unit 01 is configured to receive a signal transmitted by the radio base station apparatus 10, and to transmit a signal to the radio base station apparatus 10.

For example, the signal transmitter/receiver unit 01 is configured to receive a random access response signal used for the notification of an uplink resource from the radio base station apparatus 10. Additionally, the signal transmitter/receiver unit 01 is configured to transmit a later described random access preamble to the radio base station apparatus 10.

The random access preamble identifier selector unit 02 is configured to randomly select a random access preamble identifier among from one or multiple random access preamble identifiers, and to transmit, via the signal transmitter/receiver unit 01, a random access preamble identified with the selected random access preamble identifier.

The uplink scrambling sequence detector unit 03 is configured to detect an uplink scrambling sequence applied when the mobile station 00 transmits an uplink signal by using an uplink resource indicated by a random access response signal.

For example, the uplink scrambling sequence detector unit 03 may be configured to select an uplink scrambling sequence indicated by the random access response signal received by the signal transmitter/receiver unit 01.

In such a case, the signal transmitter/receiver unit 01 is configured to acquire such an uplink scrambling sequence together with the uplink resource assigned to the mobile station 00, on the basis of the random access response signal.

Additionally, the uplink scrambling sequence detector unit 03 may retain a correspondence table such as one shown in FIG. 4, and be configured to refer to such a correspondence table and to detect an uplink scrambling sequence corresponding to an uplink resource indicated by the radio base station apparatus 10 through the random access response signal.

Furthermore, the uplink scrambling sequence detector unit 03 may retain a correspondence table such as one shown in FIG. 5, and be configured to refer to the correspondence table and to detect an uplink scrambling sequence corresponding to a random access preamble used for the acquisition of the above described uplink resource.

Specifically, in a case where the random access response signal contains a random access preamble identifier through which a random access preamble transmitted by the mobile station 00 is identified, the uplink scrambling sequence detector unit 03 may be configured to refer to such a correspondence table and to detect an uplink scrambling sequence corresponding to such a random access preamble.

Additionally, the uplink scrambling sequence detector unit 03 may be configured to detect an uplink scrambling sequence, on the basis of a position where a random access preamble identifier for specifying a random access preamble which has been selected and transmitted to the radio base station apparatus 10 by the mobile station 00, is inserted into the random access response signal as shown in FIG. 6 (that is, a position of the random access preamble identifier inserted into the random access response signal used for the notification of such an uplink resource).

Furthermore, the uplink scrambling sequence detector unit 03 may retain a correspondence table such as one shown in FIG. 7, and be configured to refer to such a correspondence table and to detect an uplink scrambling sequence corresponding to a random access response signal identifier through which the random access response signal used for the notification of the above described uplink resource is identified.

The uplink signal generator unit 04 is configured to perform scrambling processing in which an uplink scrambling sequence detected by the uplink scrambling sequence detector unit 03 is used, and to transmit an uplink signal by using the uplink resource.

(Actions and Effects of Mobile Communication System According to First Embodiment of Present Invention)

According to the mobile communication system according to this embodiment, the mobile station 00 is enabled to perform scrambling processing on an uplink signal and to transmit the uplink signal, even during a random access procedure, whereby uplink interference to neighboring cells can be reduced.

Aspects of the above described embodiment may be expressed in the following manner.

A first aspect of the present embodiment is summarized as a mobile communication method in which a random access procedure is performed between a radio base station apparatus 10 and a mobile station 00 before communication is started or resumed therebetween, the method including the steps of: transmitting, from the mobile station 00 to the radio base station apparatus 10, a random access preamble selected among from a plurality of random access preambles; assigning, at the radio base station apparatus 10, an uplink resource to the mobile station 00 in response to the received random access preamble; notifying, from the radio base station apparatus 10 to the mobile station 00, the assigned uplink resource by using a random access response signal; transmitting, at the mobile station 00, an uplink signal by using the uplink resource notified by use of the random access response signal, after performing scrambling processing by using an uplink scrambling sequence corresponding to the uplink resource; and performing, at the radio base station apparatus 10, descrambling processing on the uplink signal transmitted by use of the uplink resource, by using an uplink scrambling sequence corresponding to the uplink resource.

A second aspect of the present embodiment is summarized as a radio base station apparatus 10 used in a mobile communication method in which a random access procedure is performed between the radio base station apparatus 10 and a mobile station 00 before communication is started or resumed therebetween, the radio base station apparatus 10 including: an uplink resource assignor unit 13 configured to assign an uplink resource to the mobile station 00 in response to a random access preamble transmitted by the mobile station 00; a random access response signal transmitter unit 11 configured to notify, to the mobile station, the uplink resource which is assigned by the uplink resource assignor unit 13, by using a random access response signal; and an uplink scramble decoder unit 16 configured to perform descrambling processing on an uplink signal transmitted from the mobile station 00 by use of the uplink resource, by using an uplink scrambling sequence corresponding to the uplink resource.

In the second aspect of the present embodiment, the random access response signal transmitter unit 11 may be configured to notify, to the mobile station 00, the uplink scrambling sequence corresponding to the uplink resource, together with the uplink resource.

In the second aspect of the present embodiment, the method may further include an uplink scrambling sequence manager unit 15 configured to store the uplink resource and the uplink scrambling sequence in association with each other, wherein the uplink scramble decoder unit 16 may be configured to refer to the uplink scrambling sequence manager unit 15, and to perform the descrambling processing by using an uplink scrambling sequence corresponding to the uplink resource.

In the second aspect of the present embodiment, the method may further include an uplink scrambling sequence manager unit 15 configured to store the random access preamble and the uplink scrambling sequence in association with each other, wherein the uplink scramble decoder unit 16 may be configured to refer to the uplink scrambling sequence manager unit 15, and to perform the descrambling processing by using an uplink scrambling sequence corresponding to the random access preamble that is a trigger for the assignment of the uplink resource.

In the second aspect of the present embodiment, the method may further include an uplink scrambling sequence manager unit 15 configured to store the random access response signal and the uplink scrambling sequence in association with each other, wherein the uplink scramble decoder unit 16 may be configured to refer to the uplink scrambling sequence manager unit 15, and to perform the descrambling processing by using an uplink scrambling sequence corresponding to the random access response signal used for the notification of the uplink resource.

In the second aspect of the present embodiment, the method may further include an uplink scrambling sequence manager unit 15 configured to store the uplink scrambling sequence and an insertion order of a random access preamble identifier in the random access response signal in association with each other, wherein the uplink scramble decoder unit 16 may be configured to refer to the uplink scrambling sequence manager unit 15, and to perform the descrambling processing by using an uplink scrambling sequence corresponding to a position where the random access preamble identifier is inserted into the random access response signal used for the notification of the uplink resource.

A third aspect of the present embodiment is summarized as a mobile station 00 used in a mobile communication method in which a random access procedure is performed between a radio base station apparatus 10 and the mobile station 00 before communication is started or resumed therebetween, the mobile station 00 including: a random access preamble transmitter unit 01 configured to transmit, to the radio base station apparatus 10, a selected random access preamble; a random access response signal receiver unit 01 configured to receive, from the radio base station apparatus 10, a random access response signal which is used for notification of an uplink resource; and an uplink signal transmitter unit 01 configured to perform scrambling processing that uses an uplink scrambling sequence corresponding to the uplink resource notified by use of the random access response signal, and to transmit an uplink signal by using the uplink resource.

In the third aspect of the present embodiment, the random access response signal receiver unit 01 may be configured to acquire the uplink scrambling sequence together with the uplink resource, on the basis of the random access response signal.

In the third aspect of the present embodiment, the mobile station 00 may further include an uplink scrambling sequence manager unit configured to store the uplink resource and the uplink scrambling sequence in association with each other, wherein the uplink signal transmitter unit 01 may be configured to refer to the uplink scrambling sequence manager unit, and to perform the scrambling processing by using an uplink scrambling sequence corresponding to the uplink resource assigned by the radio base station apparatus 10.

In the third aspect of the present embodiment, the mobile station 00 may further include an uplink scrambling sequence manager unit configured to store the random access preamble and the uplink scrambling sequence in association with each other, wherein the uplink signal transmitter unit 01 may be configured to refer to the uplink scrambling sequence manager unit, and to perform the scrambling processing by using an uplink scrambling sequence corresponding to the random access preamble used for the acquisition of the uplink resource.

In the third aspect of the present embodiment, the mobile station 00 may further include an uplink scrambling sequence manager unit configured to store the random access response signal and the uplink scrambling sequence in association with each other, wherein the uplink signal transmitter unit 01 may be configured to refer to the uplink scrambling sequence manager unit, and to perform the descrambling processing by using an uplink scrambling sequence corresponding to the random access response signal used for the notification of the uplink resource.

In the third aspect of the present embodiment, the mobile station 00 may further include an uplink scrambling sequence manager unit configured to store the uplink scrambling sequence and an insertion order of a random access preamble identifier in the random access response signal in association with each other, wherein the uplink signal transmitter unit 01 may be configured to refer to the uplink scrambling sequence manager unit, and to perform the descrambling processing by using an uplink scrambling sequence corresponding to a position where the random access preamble identifier is inserted into the random access response signal used for the notification of the uplink resource.

A fourth aspect of the present embodiment is summarized as a mobile communication method in which a random access procedure is performed between a radio base station apparatus 10 and a mobile station 00 before communication is started or resumed therebetween, the method including the steps of: transmitting, from the mobile station 00 to the radio base station apparatus 10, a random access preamble selected among from a plurality of random access preambles; assigning, at the radio base station apparatus 10, an uplink resource to the mobile station 00 in response to the received random access preamble; notifying, from the radio base station apparatus 10 to the mobile station 00, the assigned uplink resource by using a random access response signal; transmitting, at the mobile station 00, an uplink signal by using the uplink resource, after performing scrambling processing that uses an uplink scrambling sequence corresponding to the random access response signal (for example, RA-preamble identifier, timing alignment information, uplink resource, temporary C-RNTI and so on) used for the notification of the uplink resource; and performing, at the radio base station apparatus 10, descrambling processing on the uplink signal transmitted by use of the uplink resource, by using an uplink scrambling sequence corresponding to the random access response signal used for the notification of the uplink resource.

A fifth aspect of the present embodiment is summarized as a radio base station apparatus 10 used in a mobile communication method in which a random access procedure is performed between the radio base station apparatus 10 and a mobile station 00 before communication is started or resumed therebetween, the radio base station apparatus 10 including: an uplink resource assignor unit 13 configured to assign an uplink resource to the mobile station 00 in response to a random access preamble transmitted by the mobile station 00; an random access response signal transmitter unit 11 configured to notify, to the mobile station, the uplink resource which is assigned by the uplink resource assignor unit 13, by using a random access response signal; and an uplink scramble decoder unit 16 configured to perform descrambling processing on an uplink signal transmitted from the mobile station 00 by use of the uplink resource, by using an uplink scrambling sequence corresponding to the random access response signal (for example, RA-preamble identifier, timing alignment information, uplink resource, temporary C-RNTI and so on) used for the notification of the uplink resource.

A sixth aspect of the present embodiment is summarized as a mobile station 00 used in a mobile communication method in which a random access procedure is performed between a radio base station apparatus 10 and the mobile station 00 before communication is started or resumed therebetween, the mobile station 00 including: a random access preamble transmitter unit 01 configured to transmit, to the radio base station apparatus 10, a random access preamble selected among from a plurality of random access preambles; a random access response signal receiver unit 01 configured to receive a random access response signal which is used for notification of an uplink resource, from the radio base station apparatus 10; and an uplink signal transmitter unit 01 configured to perform scrambling processing that uses an uplink scrambling sequence corresponding to the random access response signal used for the notification of the uplink resource, and, to transmit an uplink signal by using the uplink resource.

Note that each of the above described operations of the mobile station 00 and the radio base station apparatus 10 may be implemented by hardware, a software module executed by a processor, or by a combination of both.

The software module may be provided in a storage medium of an arbitrary form, such as a RAM (Random Access Memory), a flash memory, a ROM (Read Only Memory), an EEPROM (Electronically Erasable Programmable ROM), a register, a hard disk, a removable disk, or a CD-ROM.

Such a storage medium is connected to a processor so that the processor can read information from, and write information into the storage medium. Such a storage medium may be integrated on the processor. Additionally, such a storage medium and such a processor may be provided in an ASIC. Such an ASIC may be provided in each of the mobile station 00 and the radio base station apparatus 10. Such a storage medium and such a processor may be provided as discrete components in the mobile station 00 and the radio base station apparatus 10.

Although the present invention has been described above in detail by use of the above described embodiment, it is apparent to those skilled in the art that the present invention shall not be limited by the embodiment described in the present description. The present invention can be implemented as an embodiment modified or changed without departing from the spirit and scope of the present invention defined by descriptions in the scope of claims. Accordingly, what is described in the present description are given for the purpose of illustrative explanation, and shall not have any restrictive implication to the present invention.

Note that, the present description of the application incorporates entirety of Japanese Patent Application 2007-213182 (filed on Aug. 17, 2007) by reference.

INDUSTRIAL APPLICABILITY

As has been described above, a mobile communication method, a radio base station apparatus and a mobile station are beneficial since the mobile communication method, the radio base station apparatus and the mobile station can reduce uplink interference to neighboring cells by enabling a mobile station to perform scramble processing on an uplink signal and then transmit the uplink signal even before a radio base station apparatus specifies the mobile station.

The invention claimed is:

1. A radio base station apparatus used in a mobile communication method in which a random access procedure is performed between the radio base station apparatus and a mobile station before communication is started or resumed therebetween, the radio base station apparatus comprising:
    an uplink resource assignor circuitry configured to assign an uplink resource to the mobile station in response to a random access preamble transmitted by the mobile station;
    a random access response signal transmitter circuitry configured to notify, to the mobile station, the uplink resource which is assigned by the uplink resource assignor circuitry, by using a random access response signal; and
    an uplink scramble decoder circuitry configured to perform descrambling processing on an uplink signal transmitted from the mobile station by use of the uplink resource, by using an uplink scrambling sequence correlating to the random access response signal.

* * * * *